United States Patent
Niebres et al.

(10) Patent No.: US 10,397,641 B2
(45) Date of Patent: Aug. 27, 2019

(54) METHODS AND SYSTEMS FOR CONTENT MANAGEMENT

(71) Applicant: Comcast Cable Communications, LLC, Philadelphia, PA (US)

(72) Inventors: Francisco Niebres, San Francisco, CA (US); Thaya Kareeson, Menlo Park, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/639,286

(22) Filed: Mar. 5, 2015

(65) Prior Publication Data

US 2016/0261915 A1 Sep. 8, 2016

(51) Int. Cl.
| | |
|---|---|
| H04N 21/25 | (2011.01) |
| H04N 21/45 | (2011.01) |
| H04N 21/239 | (2011.01) |
| H04N 21/258 | (2011.01) |
| H04N 21/431 | (2011.01) |
| H04N 21/433 | (2011.01) |
| H04N 21/442 | (2011.01) |
| H04N 21/454 | (2011.01) |
| H04N 21/4545 | (2011.01) |

(52) U.S. Cl.
CPC ..... *H04N 21/4318* (2013.01); *H04N 21/2393* (2013.01); *H04N 21/251* (2013.01); *H04N 21/25891* (2013.01); *H04N 21/4333* (2013.01); *H04N 21/4334* (2013.01); *H04N 21/44204* (2013.01); *H04N 21/44213* (2013.01); *H04N 21/4532* (2013.01); *H04N 21/4542* (2013.01); *H04N 21/4545* (2013.01)

(58) Field of Classification Search
CPC ............ H04N 21/2393; H04N 21/251; H04N 21/25891; H04N 21/4318; H04N 21/4333; H04N 21/4334; H04N 21/44204; H04N 21/4532
USPC .................................. 725/9–21, 37, 86–104
See application file for complete search history.

(56) References Cited

U.S. PATENT DOCUMENTS

| | | | |
|---|---|---|---|
| 8,432,808 B1 | 4/2013 | Dankberg et al. | |
| 9,465,435 B1* | 10/2016 | Zhang | H04N 21/44222 |
| 2008/0019516 A1 | 1/2008 | Fransdonk | |
| 2008/0066111 A1* | 3/2008 | Ellis | H04N 21/485 725/57 |
| 2008/0192820 A1 | 8/2008 | Brooks et al. | |
| 2010/0017814 A1* | 1/2010 | Archer | H04N 21/4532 725/14 |
| 2010/0251305 A1* | 9/2010 | Kimble | H04N 7/17318 725/46 |
| 2012/0102191 A1* | 4/2012 | Rabii | G06F 9/5011 709/224 |
| 2013/0297706 A1* | 11/2013 | Arme | H04N 21/4788 709/206 |

(Continued)

Primary Examiner — Jeremy S Duffield
(74) Attorney, Agent, or Firm — Ballard Spahr LLP

(57) ABSTRACT

Methods and systems for content management are disclosed. An information blocking service can be enabled to block information related to content, such as content showing a competitive event. The information blocking service can detect and analyze events associated with a user and content. The information blocking service can block, modify, or otherwise prevent the user from accessing the information.

20 Claims, 5 Drawing Sheets

(56) References Cited

U.S. PATENT DOCUMENTS

| | | | |
|---|---|---|---|
| 2014/0115031 A1* | 4/2014 | Chanderraju | H04N 21/25866 709/203 |
| 2014/0123163 A1* | 5/2014 | Inkumsah | H04N 21/251 725/14 |
| 2014/0280571 A1* | 9/2014 | Tarbox | H04N 21/4788 709/204 |

* cited by examiner

METHODS AND SYSTEMS FOR CONTENT MANAGEMENT

BACKGROUND

Competitive events and other programs can be broadcast to users at inconvenient times, such as when users are asleep or busy. Oftentimes, the result is that a viewer may watch a recording of the competitive event or program after it has been broadcast. There is a need for systems to enable a viewer to watch competitive events or other content in a manner that maintains the "live" experience even after broadcast. Otherwise, a user's viewing experience can be diminished due to "spoilers," which occur when a user receives critical information such as a final score of a game before the user has watched the game. These and other shortcomings are addressed in the present disclosure.

SUMMARY

It is to be understood that both the following general description and the owing detailed description are exemplary and explanatory only and are not restrictive, as claimed. Provided are methods and systems for information management. The methods and systems can implement an information blocking system configured to hide from and/or reveal to, a user, information related to content, such as sport scores, plot information, and social media. Event information (e.g., user actions, service provider actions) can be monitored and collected from a variety of users and content related services. The event information can be analyzed to determine whether a user is likely to prefer to receive information related to content when the information is available or whether the user is likely to prefer delaying receiving the information. The information blocking system can then take measures (e.g., send out instructions, modify content) to prevent the user from receiving the information until a later, more preferable time. For example, the methods and systems can enable the user to avoid "spoilers" that may cause the user to accidentally learn of an event (e.g., a plot twist in a television series), score, statistic, outcome and/or the like of a competitive event or other program before the user viewed the content.

In an aspect, an example method can comprise providing content to a user. The content can comprise, for example, a transmission (e.g., broadcast, narrowcast, unicast, etc. recording, stream, and/or the like of an event (e.g., sporting event, competition), show (e.g. reality show), movie, and/or the like. The content an be received and/or provided by one or more of a set top box, computer, mobile device, content server, and/or the like. One or more triggering actions can then be detected, for example, by one or more local and/or services configured to detect events from a variety of user devices. In an aspect, the triggering actions can be related to the content. For example, a triggering action can comprise favoriting an entity related to the content, pausing the content, rewinding the content, recording the content, tuning to the content (e.g., or otherwise receiving the content) for a specified time, delaying from a time of a live event communicated in the content before providing the content, a combination thereof, and/or the like.

An information blocking service can be enabled (or disabled) based on detecting the triggering action. The information blocking service can operate from a central location and can notify one or more devices that the user utilizes for content consumption. For example, the information blocking service can be enabled to notify one or more devices associated with the user to hide information related to the content. As the information blocking service is enabled, information, such as live sports scores, can be hidden from users and/or delayed in being provided to users. For example, a sports application can freeze or hide scores of a particular competitive event until an appropriate time arrives for sharing the information.

In another aspect, an example method can comprise collecting events related to a content item and/or user action and categorizing the events as indicative of whether a user prefers to delay notification of information related to the content item. The event can comprise, for example, modifying a favorite status (e.g., unfavoriting or favoriting) associated with an entity (e.g., team, competitor) related to the content item, pausing the content item, rewinding the content item, recording the content item, tuning to the content item for a specified time, delaying from a time of a live event communicated in the content item before providing the content item to the user, a combination thereof, and/or the like. The content item can comprise for example, recorded content, live content, a content stream, and/or the like. The content item can comprise and/or represent a competitive event, show, movie, and/or the like. The user action can comprise, for example, an action at a user device, such as pausing, fast forwarding, rewinding, scheduling a recording, favoriting a team, tuning to or from content, and/or the like information related to the content item can be, for example, scoring information (e.g., team scores, individual scores) associated with the competitive event, social media information (e.g., post, status, message indicating plot development), and/or the like. A determination can be made as to whether to hide the information related to the content item from the user or reveal the information related to the content item to the user based on the categorization of the events. For example, categories can include, but are not limited to, a first category of events that indicate a user's interest in delaying receiving information related to a content item and a second category of events that indicate a user's interest in receiving the information related to the content item without delay. Additionally, weight information can be assigned to events as the events are categorized. For example the first category can be associated with positive weights and the second category can be associated negative weights. A calculation can be performed that adds each of the weights of the categorized events together. If the result is positive then it can be determined to hide the information related to content from the user, but if the result is negative it can be determined to reveal the information related to content to the user. An instruction can be provided to a device to hide the information from the user or reveal the information to the user based on the determination of whether to hide the information from the user or reveal the information to the user.

In another aspect, a plurality of information blocking preferences can be received, an information blocking scheme can be applied to a plurality of content items based on the plurality of information blocking preferences, and an instruction can be sent to a device (e.g., or a group of devices, or to particular devices in a group) to prevent providing (e.g., transmitting, rendering, or otherwise making available) of information to a user based on the information blocking scheme. Additionally, consumption by the user of a first content item of the plurality of content items can be determined, and the information blocking scheme can be updated based on the consumption. One or more triggering actions can be monitored for during rendering of the first content item, and the information blocking scheme can be updated based on detecting one or more triggering actions while monitoring.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
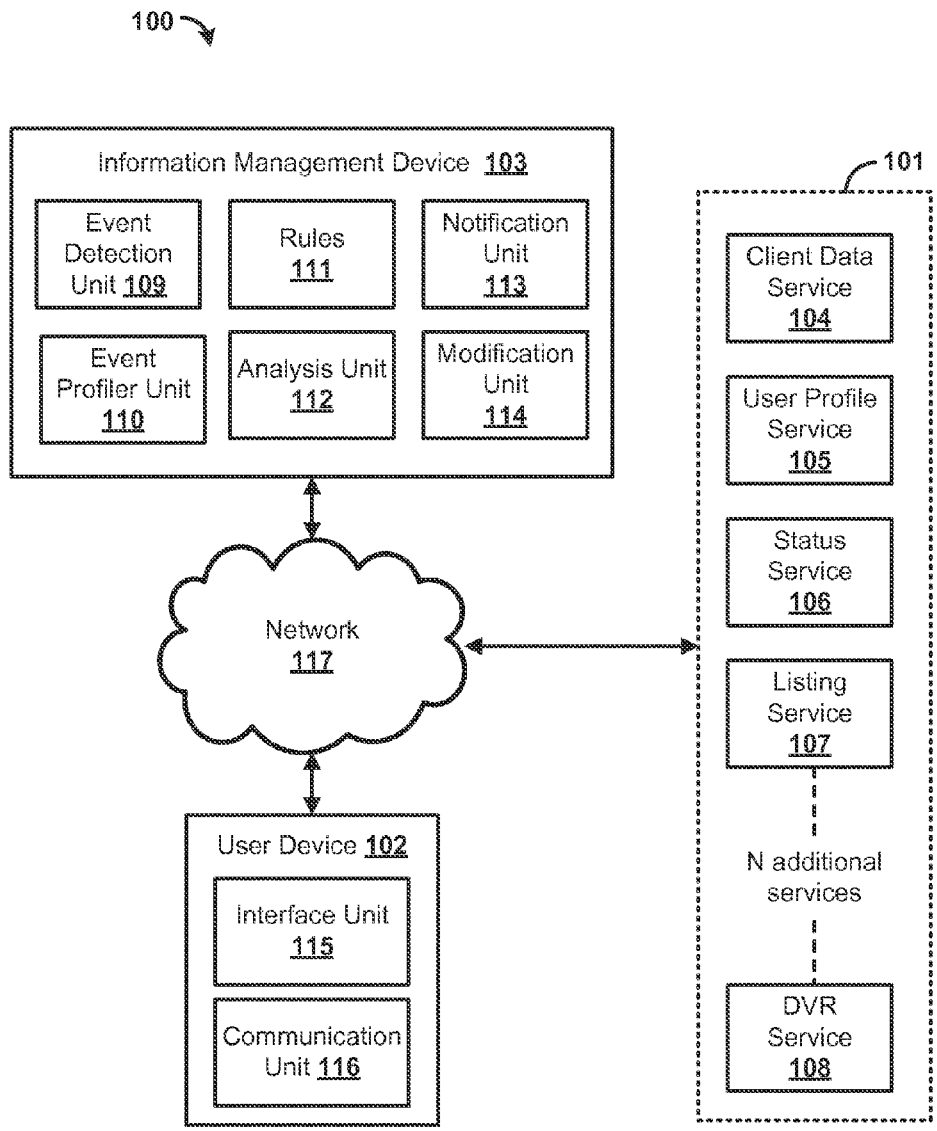
FIG. 1 illustrates various aspects of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, hut not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Competitive events, sporting events, and other content (e.g., movies, shows) air at different times in the world. For the case of Premier League, the sport events happen in the early morning hours when most US viewers are sleeping. Premier League fans wake up to find out the score of the game that aired last night and thus, might miss out on the enjoyment of the game as if the game was watched "LIVE" by the fans. Not wanting the game results "spoiled" is a very common problem among sports fans of all leagues. Sports fans may record important games but turn off and/or avoid sports news, sports apps, and/or the like and warn friends to not let the fan know the results of last night's game. However, the problem is much broader than sports and applies to any situation in which a user desires to delay receiving information related to content. For example, plot twists and other events in movies and television shows can be revealed via social media (e.g., friends' posts), news, commentary, and/or the like before the user desires to receive the information. Accordingly, the present disclosure describes methods and systems for implementing an information blocking service configured for blocking, delaying, and/or otherwise preventing information from being provided to a user when various conditions are detected.

As an example, the information blocking service can be implemented according to a first condition: a user is watching a live sporting event and the user has a sports application running. The sports application can provide game scores, stats, and/or the like to the user associated with the live sporting event. The sports application can be configured to automatically freeze game scores and stats if the sports application (e.g., or the information blocking service) detects that the user has done all of the following: the user scheduled the game for recording, and the user paused and/or rewound the game.

Once scores and stats are hidden, users have the option to manually reveal the latest game score and stats or wait for them to be revealed when a user has navigated to live content. Once scores have been revealed, the sports application (e.g., or information blocking service) can be configured to prevent the scores from automatically freezing again for that game.

As another example, the information blocking service can be implemented according to a second condition: a user has previously recorded a sporting event but has not watched the sporting event yet. When the user launches the sports application, the sports application can automatically hide game scores and stats if the sports application (e.g., or information blocking service) detects that the user has not finished watching the recorded game yet. The user can be given the option to manually reveal game scores and stats or wait for them to be revealed when the user has finished watching the recorded game. Once scores have been revealed, the information blocking service can be configured to prevent hiding of the scores again for that game.

As another example, the information blocking service can be implemented according to a third condition: a user is watching the first airing of a tape-delayed game (e.g., a game that has already finished, but has not aired in the user's network yet). When the user launches the sports application, the sports application can automatically hide game scores and stats after the sports application (e.g., or the information blocking service) detects that the game the user is watching is the first airing of a tape delayed game. The user has the option to manually reveal game scores and stats or wait for the scores and stats to be revealed when the user has finished watching the tape delayed game. Once scores have been revealed, the information blocking service can be configured to prevent hiding of the scores again for that game.

FIG. 1 illustrates various aspects of an exemplary system 100 in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a plurality of services 101, a user device 102 and an information management device 103. The system 100 can be configured to implement an information blocking service and/or information blocking scheme configured to block, freeze, hide, modify, and/or the like information related to content. As an example, the content can comprise a content item, content transmission (e.g., content stream), and/or the like. The content can comprise, represent, and/or render a competitive event, such as sports game, talent competition, game show, "reality" television competition, and/or the like. The content can comprise a show (e.g., television show), newscast (e.g., sports newscast), program, live event, movie, and/or the like. As described herein, the information related to content can comprise scoring information (e.g., team scores, individual scores), award information (e.g., player of the game), timing information (e.g., time of scoring, game time), event status (e.g., halftime, end), statistics (e.g., time of possession, running distance), plot information (e.g., character dies), social media commentary (e.g., indicating key plot developments), and/or the like. The system 100 can be configured to prevent and/or delay a user from receiving information when it is determined that the user would likely prefer to delay receiving the information. The information can later be revealed to the user when it is determined that the user likely prefers to receive the information.

In an aspect, the plurality of services 101 can be configured to assist in providing information, content, data, communication, and/or other experiences to users. The plurality of services 101 can comprise services configured to assist a service provider in a variety of tasks (e.g., with or without the knowledge of the user). The plurality of services 101 can be backend services operated by a service provider. The plurality of services 101 can be communicatively coupled (e.g., through a network, an internal bus) to the user device 102 and/or the information management device 103. One or more of the plurality of services 101 can exchange information, data, communications, and/or the like with the user device 102 and/or information management device 103. The plurality of services 101 can be implemented on a single device or multiple devices. For example, one or more of the plurality of services 101 can be implemented on the user device 102, the information management device 103, and/or other devices.

In an aspect, the plurality of services 101 can comprise a client data service 104. For example, the client data service can be configured to provide information to one or more applications on the user device 102. For example, the client data service 104 can be configured to provide information related to content, such as information related to a competitive event rendered in the content. The information related to content can comprise scoring information (e.g., team scores, individual scores), award information (e.g., player of the game), timing information (e.g., time of scoring, game time), event status (e.g., half time, end), statistics (e.g., time of possession, running distance), and/or the like. As another example, the client data service 104 can provide social media information, such as posts, messages, statuses, and/or the like.

In an aspect, the plurality of services 101 can comprise a user profile service 105 configured to receive, store, collect, analyze, and/or the like user profile information, such as geographic information (e.g., location of user), language information (e.g., preferred language), advertising preferences, recommendation history, subscription tier, purchase history, viewing history (e.g., content consumption history, pausing, rewinding, fast forwarding, changing channel), and/or the like. User profile information can also comprise favorite information. Favorite information can comprise a list of entities (e.g., teams), categories (e.g., sports type, division type), individuals (e.g., players), and/or the like associated with corresponding favorite status (e.g., not a favorite, a favorite), user "likes," rankings (e.g., most favorite, second most favorite, third most favorite, most disliked, second most disliked), user "follows," and/or the like. User profile information can also comprise information blocking preferences. For example, a user can specify that he or she prefers to have information blocked (e.g., withheld, hidden) during specified events, under certain criteria, and/or the like. For example, an information blocking preference can comprise an indication that a user prefers to delay receiving information related to a competitive event, such as scoring information, until the user has viewed content that comprises, represents, and/or renders the competitive event (e.g., or portion of the competitive event relevant to the information).

The plurality of services 101 can comprise a status service 106. The status service 106 can be configured to determine, store, analyze, transmit and/or the like consumption statuses of content. As an example, the content can comprise, represent, show, and/or render a competitive event (e.g., sporting event, a talent competition, a reality show), an award show, a political event, a news event, a movie, a television program, and/or the like. A consumption status can comprise a user interaction with content, such as requesting content, controlling navigation of content, clicking interface elements within and/or associated with content, and/or the like. A consumption status can be associated with a particular user or multiple users. As an example, the consumption status can comprise one or more of: whether the content has been consumed by a user, whether the content has been broadcast in a user network, whether the content has been stored in a cloud server, whether the content has been scheduled to be recorded, whether the content has been paused, whether the content has been rewound, whether the content has been played, and/or the like.

In an aspect, the plurality of services 101 can comprise a listing service 107 configured to manage listing information, such as channel listings (e.g., television channels), stream listings (e.g., online channels), and/or the like. The listing service 107 can be configured to maintain and/or update the listing information. The listing service 107 can provide the listing information to the user device 102. For example, the listing service 107 can provide the listing information to an application (e.g., content viewer, electronic program guide) on the user device 102.

In an aspect, the plurality of services 101 can comprise a digital video recording (DVR) service 108. The DVR service 108 can be configured to provide DVR content to users at the user device 102. For example, a DVR can receive requests to record content from the user device 102. The request can be a request to record content at a cloud location (e.g., at a location in a network remote from the user device 102), a user location (e.g., at the user device 102 or at a device managed by the user), and/or the like. The request can be a request to record content at a future time or a current time. The DVR service 108 can record the content in response to the request. The DVR service 108 can also receive requests to cancel a recording and/or scheduled recording. The DVR service 108 can cancel, stop, and/or otherwise terminate the recording of the content.

The plurality of services 101 can comprise additional services (e.g., N additional services) configured to assist in providing content to users at the user device. For example, the additional services can manage power usage, network usage, social media information, user settings, user interface information, and/or the like.

In an aspect, one or more of the plurality of services 101 can be configured to transmit information to the information management device 103. The information can be transmitted at regular intervals, upon the change of information, upon request for the information (e.g., from the information management device 103 or from the for device 102), upon a triggering event, and/or the like. For example, the status service 106 can be configured to transmit consumption statuses to the information management device 103. The DVR service 108 can be configured to transmit recording information to the information management device 103. The user profile service 105 can be configured to transmit user profile information (e.g., favorites) to the information management device 103. The client data service 104 can be configured to transmit data access information (e.g., information about a user device requesting data from the client data service 104) to the information management device 103. The listing service 107 can be configured to transmit listing access information (e.g. information about user interactions and/or navigations with listing information) to the information management device 103.

In an aspect, the information management device 103 can be a server for communicating with the user device 102. As an example, the information management device 103 can communicate with the user device 102 for providing data and/or services. The information management device 103 can provide services such as network (e.g., Internet) connectivity, network printing, media management (e.g., media server), content services, streaming services, broadband services, or other network-related services. In an aspect, the information management device 103 can allow the user device 102 to interact with remote resources such as data, devices, and files. As an example, the information management device 103 can be configured as (or disposed at) a central location (e.g., a headend, or processing facility), which can receive content (e.g., data, input programming) from multiple sources. The information management device 103 can combine the content from the multiple sources and can distribute the content to user (e.g., subscriber) locations via a distribution system of the network 117. Furthermore, the information management device 103 can be configured to implement, at least in part, an information blocking service for one or more users at one or more user devices 102 as described herein.

The information management device 103 can comprise an event detection unit 109 configured to detect events. For example, the event detection unit 109 can receive information from one or more of the plurality of services 101. The event detection unit 109 can determine whether the received information is indicative of an event relevant to the information blocking service. For example, the event detection unit 109 can comprise a data store (e.g., list, database) of predefined events relevant to the information blocking service. The event detection unit 109 can compare the received information (e.g., or event identified from the information) to the stored events (e.g., or criteria defining the events) to determine if the received information is relevant to the information blocking service. In another aspect, the event detection unit 109 can store the detected events (e.g., for later processing by the event profiler unit 110). Each of the detected events can be associated with a particular content item, entity (e.g., sports team), user (e.g., user account), and/or the like.

By way of illustration, the event detection unit 109 can detect the following events: a request for data (e.g., request for event scoring information, request to reveal hidden information) received at the client data service 104, an update to user profile information (e.g., favoriting, unfavoriting, change in location, change in subscription tier) detected by the user profile service 105, a change in consumption status (e.g., requesting content, pausing, rewinding, fast forwarding, tuning away, finishing content) detected by the status service 106, a navigational update for a content listing (e.g., navigating in a direction, hovering over, selecting an item of a channel list) detected at the listing service 107, a notification related to a recording (e.g., scheduling a recording, completing a recording, beginning a recording, automatic recording based on recommendation), and/or the like.

In an aspect, the event detection unit 109 can be configured to determine that one or more of the events are triggering events. A triggering event can comprise an event that triggers a check operation, a reveal operation, and/or other similar operation. A check operation can comprise an operation to check whether to hide information from a user. A reveal operation can comprise an operation to reveal information to the user. A triggering event can be associated with a particular content item, entity (e.g., sports team), user (e.g., user account), and/or the like. The following are examples of triggering events that can be defined to trigger a check operation: a user launches a client (e.g., user device 102 or an application thereon such as a sports application), a user is watching a live airing of content (e.g., competitive event, sports game) and pauses the content, a user is watching a tape-delayed airing of the content, a user is watching a recording of the content, and/or the like. The following are examples of triggering events that can be defined to trigger a reveal operation: a user navigates to (e.g., after pausing) a live airing of content (e.g., a competitive event), a user completes watching recorded content (e.g., of the competitive event) or a tape delayed airing of the content, a user requests (e.g., opts in) to see the information related to the content.

In an aspect, the information management device 103 can comprise an event profiler unit 110. The event profiler unit 110 can be configured to categorize the events identified by the event detection unit 109. The event profiler unit 110 can be configured to categorize the events in response to detection of a particular event, such as a check event, or in response to detecting the event. The event profiler unit 110 can be configured to categorize the events as indicative of whether a user prefers to delay notification of information related to the content item or as indicative of whether the user prefers not to delay notification of the information related to content item. For example, if an event suggests that a user is already informed about and/or not interested in the information related to the content item, the event can be categorized as indicating that the user prefers not to delay notification. If an event suggests that a user is not already informed about and/or is interested in the information related to the content item, the event can be categorized as indicating that the user prefers to delay notification. In an aspect, the events can be categorized based on a plurality of predefined events and corresponding event categories. If an event matches (e.g., within a threshold) the predefined event, then the event can be associated with the corresponding event category.

In another aspect, the event profiler unit 110 can be configured to assign a corresponding weight to each of the identified events. For example, the predefined events can be associated with corresponding weights (e.g., 0, −1, 1, −2, 2, −3, 3, or any number, symbol, or category appropriate to distinguish different weights). If an event matches a predefined event then the event can be associated with the corresponding weight. In one aspect, a weight can be a positive weight (e.g., weight defined by a positive number) or a negative weight (e.g., weight defined by a negative number). Whether a weight associated with an event is a positive weight or a negative weight can be based on the categorization of the event. For example, negative weights can be associated with events categorized as indicating that the user prefers not to delay notification of information related to the content item. Positive weights can be associated with events categorized as indicating that the user prefers to delay notification of information related to the content item.

In an aspect, a category and/or weight can be received and/or communicated as a signal. One or more of the plurality of services 101 can provide the weight to the event profiler unit 110 (e.g., from an event profiler provided by the service). For example, a negative signal can signify a negative weight. A positive signal can signify a positive weight. An amplitude level, a number of times a signal is repeated, and/or the like can indicate an amount of negative or positive weight.

By way of illustration, an example scenario for categorizing events is described as follows. The following example events can be categorized as indicating that a user prefers to delay notification of information: a first event—a user schedules a recording of content (e.g., competitive event, show); a second event—the content is provided live or a tape delayed airing of the content has never been aired; a third event—a user has favorited an entity associated with the content (e.g., a team of the competitive event, a character of a show); a fourth event—the user has watched the content (e.g., live airing, tape delayed airing, or recording) for more than a specified time (e.g., 30 minutes). As an example, the first event can have a weight of +1, the second event can have a weight of +1, the third event can have a weight of +2, and the fourth event can have a weight of +1.

The following example events can be categorized as indicating that a user prefers not to delay notification of information: a fifth event—user cancels or deletes a recording of the content; a sixth event—newer content involving one or more of the favorite entities (e.g., teams of the competitive event, character of a show) has finished recording; a seventh event—the user paused the content (e.g., live airing) for longer than a predefined time (e.g., 30 minutes); an eighth event—while watching content (e.g., live or tape delayed), the user stops watching the content (e.g., changes the channel, walks away) and does not resume watching for a predefined time (e.g., 30 minutes); and a ninth event—user unfavorites at least one of the entities associated with the content (e.g., teams of the competitive event). The fifth event can have a weight of −2, the sixth event can have a weight of −1, the seventh event can have a weight of −1, the eighth event can have a weight of −1, and the ninth event can have a weight of −2.

In an aspect the information management device 103 can comprise an analysis unit 112. In an aspect, the analysis unit 112 can be configured to determine whether to hide or reveal the information related to the content based on an information blocking scheme. The information blocking scheme can comprise one or more rules 111 for categorization, weighing, and analyzing events. The one or more rules 111 can comprise rules for determining whether to prevent information related to content from being provided to particular users. For example, the one or more rules 111 can comprise evaluation rules for determining results based on the categorization, weights, and/or the like of detected events, settings, and/or circumstances. The one or more rules 111 can be customized to various users by machine learning) or be the same for all users. The information blocking scheme can be applied to users by default or to users who opt in to the information blocking service. The information blocking scheme can exclude other users by default or exclude other users who opt out of the information blocking service. Applying the information blocking scheme can comprise evaluating events from a plurality of users and making various determinations (e.g., to hide or reveal content) for the users. For example, different determinations can be made for different users depending on the events detected for the user.

In an aspect, the analysis unit 112 can be configured to determine whether to hide the information from the user or reveal the information to the user based on and/or in response to detection of a triggering event, such as a check event. The analysis unit 112 can be configured to perform one or more calculations (e.g., based on the evaluation rules of the information blocking scheme) such as adding, subtracting, multiplying, dividing, and/or the weights of the events. For example, positive weights and negative weights associated with the events can be added together to determine a result. If the result is positive, then it can be determined to hide the information from the user. If the result is negative, then it can be determined to reveal the information to the user.

By way of illustration, an example scenario for determining whether to hide the information from the user or reveal the information to the user is described as follows. The analysis unit 112 can receive the following events and corresponding weights: the user has an entity (e.g., "San Francisco" giants) favorited (e.g., weight of +2), the user has scheduled a recording for content (e.g., the game "San Francisco vs. Philadelphia") (e.g., weight of +1), the content is provided to the user live (e.g., is aired as the game or is being played) (e.g., weight of +1), and the user subsequently cancels the recording (e.g., weight of −2). The analysis unit 112 can determine a net positive result of +2 by adding the weights as follows: (+2)+(+1)+(+1)+(−2)=2. Accordingly, the analysis unit 112 can determine to enable the information blocking service for the user to block, hide, and/or the like the information related to the content for the user.

In an aspect, the information management device 103 can comprise a notification unit 113 configured to provide one or more notifications. For example, the information management device 103 can be configured to provide a notification to the user device, a remote device, a service (e.g., application, modification unit 114) on the information management device 103, and/or the like. The notification can comprise an instruction to hide or reveal information. For example, the information can comprise information related to a content item, information related to an entity (e.g., team, individual), information related to a competitive event, and/or the like. For example, the notification can comprise an instruction to an application, such as a sports application, to hide or reveal scoring information for a competitive event, team, individual, content item, and/or the like. The notification can comprise an instruction to "freeze" scoring associated with a specific time. For example, the instruction to freeze scoring can be configured to prevent updates to scoring past a certain time (e.g., the time when the user paused the content item), until a certain time (e.g., until the user watches at least a portion of the content item), and/or the like. The notification can comprise an instruction to modify a content item. For example, the information can be embedded in, bundled with, contained with, or otherwise a part of the content item. The instruction to modify the content item can instruct a device to modify the information within the content item. As described in further detail herein, a modification unit 114 can implement modification of the content item and/or modification of the information within the content item.

In an aspect, the notification unit 113 can be configured to provide the notification based on the result of the analysis unit 112. For example, if the result is positive, the notification can comprise an instruction to hide to the information. If the result is negative, the notification can comprise an instruction to reveal the information. In another aspect, the notification can be provided in response to a triggering event. The one or more notifications can be provided based on and/or in response to detection of a triggering event, such as a check event or a reveal event. For example, if a check event is detected, the analysis unit 112 can determine whether to hide or reveal information related to content. Depending on the result, the notification unit 113 can provide a notification to hide the information or a notification to reveal the information. In some scenarios, the notification unit 113 may not provide a notification, for example, if the check operation does not produce a different result than previous results. In some implementations, if a reveal event is detected, then a notification to reveal the information can be provided without a corresponding determination from the analysis unit 112 to hide or reveal information from the user.

In an aspect, the information management device 103 can comprise a modification unit 114. In an aspect, the modification unit 114 can be configured to access content (e.g., content item, content stream, content transmission) from a content provider via, a content distribution network. The content can comprise information related to the content, such as scoring information (e.g., team scores, individual scores), award information (e.g., player of the game), timing information (e.g., time of scoring, game time), event status (e.g., half time, end), statistics (e.g., time of possession, running distance), and/or the like. As another example, information related to the content can be related to a key moment (e.g., ending, score, attempted score, half time) in a sporting event, movie, television show and/or the like. For example, the information related to the content can comprise social media information. The modification unit 114 can modify the accessed content. Modifying content can comprise modifying a presentation status associated with the information related to the content. For example, the information related to the content can comprise and/or be associated with a presentation status, such as activated or deactivated, hidden or revealed, delayed (e.g. paused) or live, and/or the like. As another example, modifying the content can comprise removing the information related to the content from the content and/or adding information related to the content into the content. The modified content can be transmitted to one or more user devices (e.g., user device 102).

The information management device 103 can be configured to modify the content item based on receiving information (e.g., consumption status, favorite information) from one or more of the plurality of services 101, detecting of an event (e.g., a triggering event), the result of determining whether to hide or reveal the information, and/or the like. For example, if the analysis unit 112 determines that a user prefers to delay receiving the information (e.g., a positive result), the modification unit 114 can be configured to modify the content to remove the information, set the presentation status to deactivated (e.g., or hidden, delayed), and/or the like. If the analysis unit 112 determines that a user prefers not to delay receiving the information (e.g., a negative result), the modification unit 114 can be configured to modify the content to add the information, set the presentation status to activated (e.g., or revealed, live), and/or the like.

By way of illustration, the information management device 103 can be configured to modify (e.g., block, remove, set presentation status to deactivated, hidden, or delayed) the information (e.g., sports scores) related to the content and/or provide a notification to hide, delay, and/or block the information related to the content in response to one or more of the following conditions: a content item (e.g., live sports game) has been scheduled to be recorded and has not been consumed by a content requestor, a content item (e.g., live sports game) has been scheduled to be recorded and the content item (e.g., live sports game) involves a content requestor's favorite team, a content item (e.g., a sports game) has taken place but has not been broadcast in the content requester's network, a requested content item (e.g., a football game) has not been broadcast in the content requester's time zone, and/or the like.

The information management device 103 can be configured to modify (e.g., add set presentation status to activated, revealed, or live) the information (e.g., sports scores) related to content and/or provide a notification to reveal, allow, update, and/or provide the information related to the content in response to one or more of the following conditions: while watching requested content, the content requestor changed channel and did not come back for a specific period of time, the user navigates to live content (e.g., after pausing), the user completes watching a recorded or tape delayed content, the user requests data, and/or the like.

In an aspect, the information blocking service can be enabled and later disabled (e.g., or vice versa) for the same content item and user depending on the events detected by the information management device 103. As an illustration, after detecting that a user has scheduled to record a content item, and the content item involves one or more (e.g., two) of the user's favorite entities (e.g., teams), the information management device 103 can enable the information blocking service to block information related to the content (e.g., scores) when the content item is provided to the user device 102. Subsequently, if the content requestor canceled recording of the content item, and the content requestor stops watching the content item (e.g., walks away, changes channel) and does not resume watching the content item within a specific time period, the information management device 103 can determine that the content requestor is not interested in the content item anymore and/or no longer prefers for the information to be delayed, blocked, and/or hidden. Accordingly, the information management device 103 can disable the information blocking service thereby revealing the information, updating the information, allowing the information to be provided to the user, and/or the like.

As an illustration, the system 100 can be used in content (e.g., television (TV)) personalization. For example, the status service 106 can determine an identity of a user in front of a user device (e.g., a TV, a mobile device) by facial recognition. The user profile information (e.g., viewing history) can then be retrieved and used by the information management device 103. For example, if a user watches a program (e.g., a sports event) in front of a TV and then moves away from the TV, then the user continues to watch the same program (e.g., the sports event) via his or her mobile device, the information management device 103 (e.g., via the status service 106) can monitor such behavior by obtaining a viewing history of the user. The information management device 103 can then provide (e.g., or direct another device to provide) the program (e.g., the sport event) to the user's mobile device based on the user's viewing history. Specifically, the program can be provided to the user's mobile device at the point at which the user moved away from the TV. The information management device 103 can be configured to notify a service (e.g., local service or service on a user device, content delivery device) to hide or reveal information related to the program (e.g., scoring information) and/or to modify the program to hide (e.g., deactivate) or reveal (e.g., activate) the information in the program.

As previously explained, the system 100 can comprise a user device 102. The user device 102 can be configured to provide content, services, information, applications, and/or the like to one or more users. For example, the user device 102 can comprise a computer, a smart device (e.g., smart phone, smart watch, smart glasses, smart apparel, smart accessory), a laptop, a tablet, a set top box, a display device (e.g., television, monitor), digital streaming device, proxy, gateway, transportation device (e.g., on board computer, navigation system, vehicle media center), sensor node, and/or the like.

In one aspect, the user device 102 can comprise an interface unit 115 configured to provide an interface to a user to interact with the user device 102 and/or remote devices, such as the information management device 103. The interface unit 115 can be any interface for presenting and/or receiving information to/from the user, such as user feedback. An example interface can comprise a content viewer, such as a web browser (e.g., Internet Explorer®, Mozilla Firefox®, Google Chrome®, Safari®, or the like), media player, application (e.g., web application, and/or the like. Other software, hardware, and/or interfaces can be used to provide communication between the user and one or more of the user device 102 and the information management device 103.

In an aspect, the interface unit 115 can comprise a first application configured to provide information related to content. For example, the first application can provide the information related to the content in an overlay, side window, and/or other user element above and/or next to the content (e.g., provided via the content viewer). The first application can provide the information on a separate device (e.g., smart device, tablet, computer) from the device on which the content is received (e.g., set top box). In an aspect, the first application can be configured to extract the information related to the content from the content, receive the information related to the content separately from the content (e.g., from the information management device 103, client data service 104, content server), and/or the like. The first application can be configured to receive a notification to hide or reveal information related to the content from the notification unit 113. For example, if the first application receives a notification to hide the information related to the content, then the first application can place an overlay over the information to block display of the information, set the information as hidden (e.g., thereby preventing display), withhold the information from display, prevent the information from updating previously received information (e.g., prior scoring information), and/or the like. If the first application receives a notification to reveal the information related to the content, the first application can reveal the information by updating prior content, setting the information as visible (e.g., thereby revealing), allowing the information to be displayed to the user, and/or the like.

In some implementations, one or more of the plurality of services 101, the functionality of the information management device 103, and/or the like can be implemented fully or in part on the user device 102. For example, events can be detected, categorized, and/or analyzed on the user device 102. Notifications to hide or reveal information related to content can be provided from one application and/or service on the user device 102 to another application and/or service on the user device 102 or an additional user device. For example, notifications can be provided from a gateway, set top box, and/or the like associated with the user to a smart device, computer, tablet, and/or the like associated with the user (e.g., on user premises, owned by the user, managed by the user). Additionally, the user device 102 can be configured to modify the content as explained herein based on a determination to hide or reveal information related to the content.

In an aspect, the user device 102 can comprise a communication unit 116. As an example, the communication unit 116 can request or query various files from a local source and/or a remote source. As a further example, the communication unit 116 can transmit and/or receive data to a local or remote device such as the information management device 103. The communication unit 116 can comprise hardware and/or software to facilitate communication. For example, the communication unit 116 can comprise one or more of a modem, transceiver (e.g., wireless transceiver)), digital-to-analog converter, analog-to-digital converter, encoder, decoder, modulator, demodulator, tuner (e.g., QAM tuner, QPSK tuner), and/or the like. In one aspect, the communication unit 116 can be configured to allow one or more remote devices (e.g., in a local or remote portion of the network 117) to control operation of the user device 102.

In one aspect, the system 100 can comprise a network 117. In one aspect, the network 117 can comprise a packet switched network (e.g., internet protocol based network), a non-packet switched network (e.g., quadrature amplitude modulation based network), and/or the like. The network 117 can comprise network adapters, switches, routers, modems, and the like connected through wireless links (e.g., radio frequency, satellite) and/or physical links (e.g., fiber optic cable, coaxial cable, Ethernet cable, or a combination thereof). The network 117 can comprise public networks, private networks, wide area networks (e.g., Internet), local area networks, and/or the like. The network 117 can comprise a content access network, content distribution network, and/or the like, in one aspect, the network 117 can be configured to provide communication from telephone, cellular, modem, and/or other electronic devices to and throughout the system 100. For example, the network 117 can be configured to communicatively couple one or more of the plurality of services 101, the user device 102, the information management device 103, and/or the like.

In an aspect, one or more of the plurality of services 101 and the information management device 103 can be implemented as separate network entities or reside in a common location. In the latter case, the communication between the one or more of the plurality of services 101 and the information management device 103 can be performed by way of internal functionality. For example, the communication can be made by sending internal messages, communicating via a communication protocol between devices through direct links, and the like. In another aspect, the methods and systems disclosed can be located within one or more of the plurality of services 101, the information management device 103, the user device 102, and/or the like.

Figure 2:
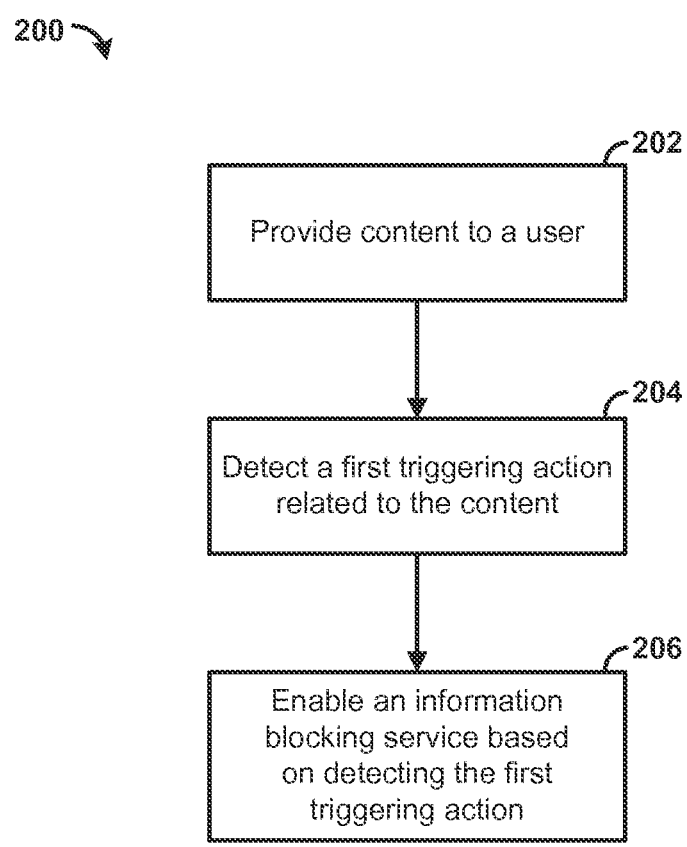
FIG. 2 is a flowchart illustrating an example method.

FIG. 2 is a flowchart illustrating an example method 200. At step 202, content can be provided (e.g., sent, transmitted, delivered) to a user (e.g., at a user device). For example, the content can comprise, represent, and/or render a competitive event, such as a sporting event, talent competition, and/or the like. The content can comprise a show, movie, and/or the like. The content can comprise live content (e.g., from a cable delivery network and/or a network stream), recorded content, and/or the like. The content can be provided via a cable delivery network, network stream, local transmission (e.g., via local storage), and/or the like.

At step 204, a first triggering action related to the content can be detected. The first triggering action can comprise an event relevant to an information blocking service. For example, the first triggering action can comprise a check event, a reveal event, another event relevant to the information blocking service, a combination thereof, and/or the like. In an aspect, the first triggering action can comprise a user action. The user action can be indicative of: the user being uninformed about the information related to the content, an interest of the user in delaying receiving the information, a combination thereof, and/or the like. In an aspect, the first triggering action can be an action of a device (e.g., device managed by a content provider and/or service provide) such as detection of an event, circumstance, property, attribute, and/or the like. By way of example, the first triggering action can comprise favoriting an entity related to the content, pausing the content, rewinding the content, recording the content, tuning to the content for a specified time, delaying from a time of a live event communicated in the content before providing the content, a combination thereof, and/or the like.

In an aspect, the method 200 can comprise categorizing the first triggering action as being indicative of an interest of the user in delaying the receiving of information related to the content. The information related to the content can comprise scoring information associated with the competitive event, social media information (e.g., related to a plot development), and/or the like. For example, the information related to the content can comprise team scores, individual scores, and/or the like. For example, the first triggering action can be categorized as being indicative of an interest of the user in delaying receiving information (or an interest in receiving the information without delay). For example, certain actions can be predefined as indicating the interest of the user in delaying receiving of the information (or an interest in receiving the information without delay). Additionally, categorizing the first triggering action can comprise assigning a weight of the first triggering action as being indicative of a user interest in delaying receiving the information (or in a user interest in receiving the information without delay).

At step 206, an information blocking service can be enabled based on detecting the first triggering action. The information blocking service can be enabled to notify one or more devices associated with the user to hide information related to the content. The information blocking service can be enabled based on categorizing the first triggering action.

The information blocking service can be configured to notify the one or more devices associated with the user to prevent updates to the information from being displayed to the user. For example, the one or more devices can comprise a set top box, a mobile device (e.g., smart phone, smart watch, smart glasses, smart apparel), television, on board device (e.g., navigational device, multimedia device), computer station, laptop, and/or the like. The one or more devices can be configured to: discard the information related to the content, delay display of the information related to the content (e.g., until receiving another notification, until detecting an event), notify the user that the information is being withheld, provide an option for the user to request the withheld information, and/or the like.

In another aspect, the method 200 can comprise disabling the information blocking service for the user and notifying the one or more devices to reveal the information related to the content. For example, the information blocking service can be disabled in response to a second triggering action. The second triggering action can comprise any action or series of actions that indicate the user is no longer interested in hiding the information, such as, unfavoriting the entity, canceling a recording (e.g., or scheduled recording), pausing for more than a predefined time (e.g., 30 minutes), tuning to a different channel and not returning to content for a predefined time, and/or the like.

Figure 3:
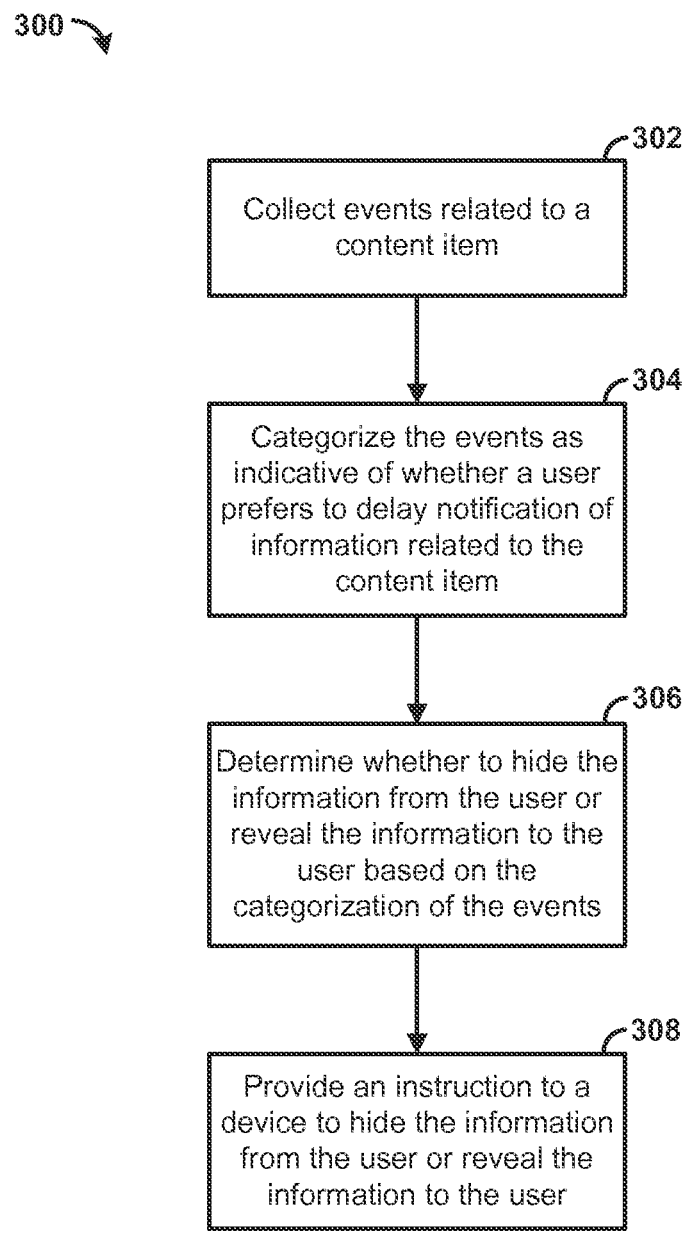
FIG. 3 is a flowchart illustrating another example method.

FIG. 3 is a flowchart illustrating an example method 300. At step 302, events related to a content item and/or a user action can be collected. Collecting events related to the content item can comprise monitoring a plurality of content related services. For example, the client data service 104, user profile service 105, status service 106, listing service 107, DVR service 108, and/or the like can be monitored for events. For example, the plurality of content related services can provide notifications, messages, and/or the like indicating the occurrence of one or more of the events.

The events can comprise, for example, modifying a favorite status (e.g., unfavoriting or favoriting) associated with an entity (e.g., team, competitor) related to the content item, pausing the content item, rewinding the content item, recording the content item, tuning to the content item for a specified time, delaying from a time of a live event communicated in the content item before providing the content item to the user, a combination thereof, and/or the like. By way of further example, the events can comprise canceling a recording (e.g., or scheduled recording), pausing for more than a predefined time (e.g., 30 minutes), tuning to a different channel and not returning to content item for a predefined time, and/or the like. The events can comprise user actions, actions of a device (e.g., device managed by a content provider and/or service provider), such as detection of a user action, circumstance, property, attribute, and/or the like.

The content item can comprise a competitive event, such as a sporting event, talent competition, and/or the like. The content item can comprise a movie, show, and/or the like. The content item can be associated with and/or comprise information related to the content item. The information related to the content item can comprise scoring information (e.g., team scores, individual scores) associated with the competitive event, social media information (e.g., post, status, message indicating plot development), and/or the like. The scoring information can comprise number of points, time information (e.g., competitive time, time of scoring event), number of votes, ranking of competitors, award information (e.g., medals), and/or the like.

At step 304, the events can be categorized as indicative of whether a user prefers to delay notification of the information related to the content item (or prefers not to delay notification of the information related to content item). For example, if an event suggests that a user is already informed about and/or not interested in the information related to the content item, the event can be categorized as indicating that the user prefers not to delay notification. If an event suggests that a user is not already informed about and/or is interested in the information related to the content item, the event can be categorized as indicating that the user prefers to delay notification. In an aspect, the events can be categorized based on a plurality of predefined events and corresponding event categories. If an event matches (e.g., within a threshold) the predefined event, then the event can be associated with the corresponding event category. The event categories can include, but are not limited to, a first category of events that indicate a user's interest in delaying receiving information related to a content item and a second category of events that indicate that user's interest in receiving the information related to the content item without delay.

In another aspect, the method 300 can comprise assigning a weight to each of the events. For example, the predefined events can be associated with corresponding weights (e.g., 0, −1, 1, −2, 2, −3, 3, or any number or category appropriate to distinguish different weights). If an event matches a predefined event, then the event can be associated with the corresponding weight. In one aspect, a weight can be a positive weight (e.g., weight defined by a positive number) or a negative weight (e.g., weight defined by a negative number). Whether a weight associated with an event is a positive weight or a negative weight can be based on the categorization of the event. For example, negative weights can be associated with events categorized as indicating that the user prefers not to delay notification of information related to the content item. Positive weights can be associated with events categorized as indicating that the user prefers to delay notification of information related to the content item.

At step 306, a determination can be made as to whether to hide the information from the user or reveal the information to the user based on the categorization of the events. Determining whether to hide or reveal the information to the user can be based on the corresponding categorization and/or corresponding weight of each of the events. The determination can be made based on adding, subtracting, multiplying, dividing, and/or the like the weights of the events related to the content item. For example, positive weights and negative weights associated with the events can be added together to determine a result. If the result is positive, then it can be determined to hide the information from the user. If the result is negative, then it can be determined to reveal the information to the user.

In an aspect, the method 300 can comprise determining one or more devices associated with the user. A device can be determined (e.g., selected) from the one or more devices based on an application being on the device. The application can be configured to provide the information to the user (e.g., at least when instructed to provide the information). For example, the application can comprise a news application, sports application, live event application, user interface (e.g., of a set top box, television, media streaming device), and/or the like. As a further example, the application can comprise a sports application configured to provide statistics, scores, and/or the like related to one or more sports teams, individuals, categories of sporting events (e.g., college football, major league baseball), and/or the like. As another example, the application can comprise a social media application configured to provide posts, messages, status, likes, links, and/or the like. The device can comprise a set top box, a mobile device (e.g., smart phone, smart watch, smart glasses, smart apparel), television, on board device navigational device, multimedia device), computer station, laptop, and/or the like.

At step 308, an instruction can be provided to the device to hide the information from the user or reveal the information to the user based on the determination of whether to hide the information from the user or reveal the information to the user. The instruction can be provided to the device in response to a request for the information from the application on the device. By way of example, providing the instruction to the device to hide the information can comprise providing a notification to freeze the information thereby preventing the information from being updated. The events can comprise a first event of scheduling a recording and a second event of at least one of pausing and rewinding the recording. The notification to freeze the information can be in response to the occurrence of both the first event and second event.

Figure 4:
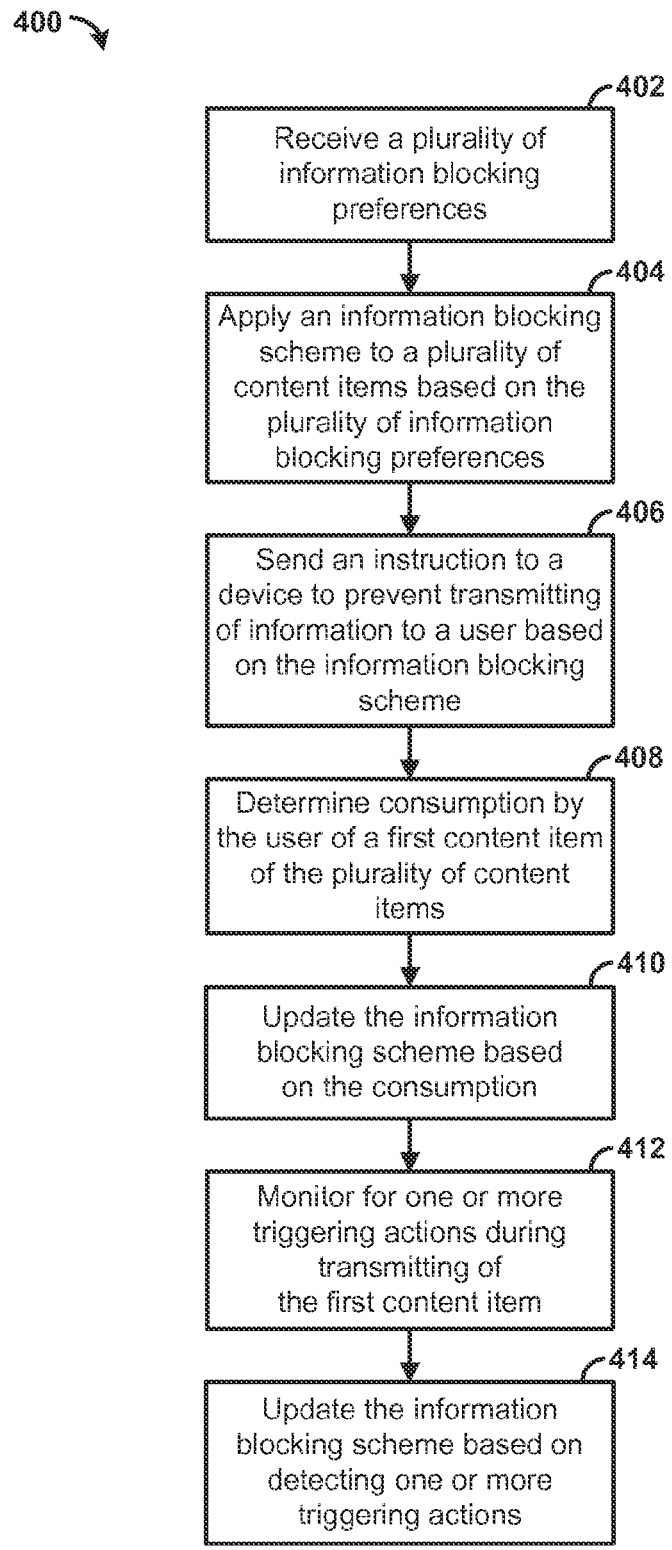
FIG. 4 is a flowchart illustrating another example method.

FIG. 4 is a flowchart illustrating an example method 400. At step 402, a plurality of information blocking preferences can be received. The plurality of information blocking preferences can be received from one or more users. For example, the one or more users can provide the information blocking preferences in a user interface. In one aspect, receiving the plurality of information blocking preferences can comprise determining information blocking preferences based on user history previously blocked information), user favorites (e.g., favorite teams), and/or the like. The information blocking preferences can comprise preferences to block information related to one or more competitive events, competitive teams, competitive individuals, and/or the like. The information blocking preferences can comprise timing information indicative of when to block the information. For example, the timing information can comprise competition times, generalized instructions to block information while specified conditions exist, and/or the like. Example conditions can comprise a condition to block information until the user has watched a specified portion of the game (e.g., all of the game, the part relevant to the information such as when a score occurs), a condition to block information after a user action (e.g., pausing content, recording content), and/or the like.

At step 404, an information blocking scheme can be applied to a plurality of content items based on the plurality of information blocking preferences. For example, the information blocking scheme can comprise one or more rules for blocking information related to content. Applying the information blocking scheme can comprise evaluating one or more of the rules based on the information blocking preferences. For example, applying the information blocking scheme can result in a determination to block first information related to a first team, first event, first time period, first content item (e.g., show) and/or the like. Applying the information blocking scheme can result in a determination not to block second information related to a second team, second event, second time, and/or the like.

As a further illustration, applying the information blocking scheme for a first user can result in a first determination, while applying the information blocking scheme for a second user can result in a second determination. The first determination can be a determination to block first information related to a first team, first event, first time period, and/or the like while the second determination can be a determination not to block the first information related to the first team, first event, first time period, and/or the like.

At step 406, an instruction to prevent transmitting, making available, providing, presenting (e.g., rendering, displaying), and/or the like of information to a user can be sent to a device based on the information blocking scheme. For example, the instruction can be sent based on applying the information blocking scheme (e.g., one or more determinations resulting from applying the information blocking scheme). The device can comprise a set top box, a mobile device (e.g., smart phone, smart watch, smart glasses, smart apparel), television, on board device (e.g., navigational device, multimedia device), computer station, laptop, and/or the like. The instruction can be sent by one or more of the plurality of services 101, a second device (e.g., information management device 103), and/or the like to the device. The instruction can be sent via a network, such as a content delivery network and/or content access network. For example, the instruction can be sent a downstream token, as an Internet protocol based transmission, via a local bus, from one module to another module, and/or the like. As a further example, the instruction can be sent to an application (e.g., sports scoring application) and/or service on the device.

At step 408, consumption by the user of a first content item of the plurality of content items can be determined. Determining consumption by the user of the first content item of the plurality of content items can comprise determining that the user has paused the first content item, rewound at least a portion of the first content item, recorded a least a portion of the first content item, tuned away from the first content item, tuned to the first content item, a combination thereof, and/or the like. For example, the device can provide a notification indicating the consumption by the user (e.g., in response to a change in consumption). For example, consumption by the user of the first content item can be detected by the status service 106, information management device 103, and/or the like. As a further example, a service on the device, such as the status service 106 or a device configured to communicate with the status service 106 can (e.g., continuously) determine consumption by detecting, analyzing, and/or the like, requests from the user (e.g., request to pause, play, rewind, fast forward, tune).

At step 410, the information blocking scheme can be updated based on the consumption. For example, the information blocking scheme can be updated for the user. Updating the information blocking scheme based on the consumption can comprise turning on information blocking for the user or turning off information blocking for the user in response to the consumption (or change in consumption).

At step 412, one or more triggering actions can be monitored for while (e.g., during) transmitting, making available, providing, presenting (e.g., rendering, displaying), and/or the like the first content item. The one or more triggering actions can comprise favoriting an entity related to the first content item, recording the first content item, tuning to the first content item for a specified time, delaying from a time of a live event communicated in the first content item before providing the first content item, a combination thereof, and/or the like. For example, one or more of the plurality of services 101 can be configured to detect, monitor, and/or otherwise listen for the occurrence of the triggering actions. For example, the device can be configured to notify one or more of the plurality of services 101 of a variety of events, such as events relevant to the user. A second device (e.g., information management device 103), one or more of the plurality of services 101, and/or the like can receive the notification of the events and determine if any of the events are triggering actions.

At step 414, the information blocking scheme can be updated based on detecting one or more triggering actions (e.g., while monitoring for the one or more triggering actions). For example, the one or more triggering actions can be detected by analyzing events and/or notifications of events and determining that one or more of the events are triggering actions. For example, triggering actions can be indicative of a user's interest in receiving information without delay or of the user's interest in delaying receiving of information. For example, the events can be determined to be triggering actions based on predefined criteria (e.g., certain events defined as triggering actions, a combination of events comprise a triggering action), artificial intelligence (e.g., machine learning), and/or the like.

Updating the information blocking scheme based on detecting one or more triggering actions can comprise turning on information blocking for the user or turning off information blocking for the user in response to the one or more triggering actions. In an aspect, the method 400 can further comprise sending a second instruction to the device to allow rendering of information to the user based on the information blocking scheme being updated based on the consumption.

In another aspect, the information blocking scheme can be updated differently for different content items. For example, monitoring for one or more triggering actions during rendering of the first content item can comprise detecting a change to a second content item. Updating the information blocking scheme based on detecting one or more triggering actions can comprise turning on information blocking for the first content item and turning off information blocking for the second content item.

Figure 5:
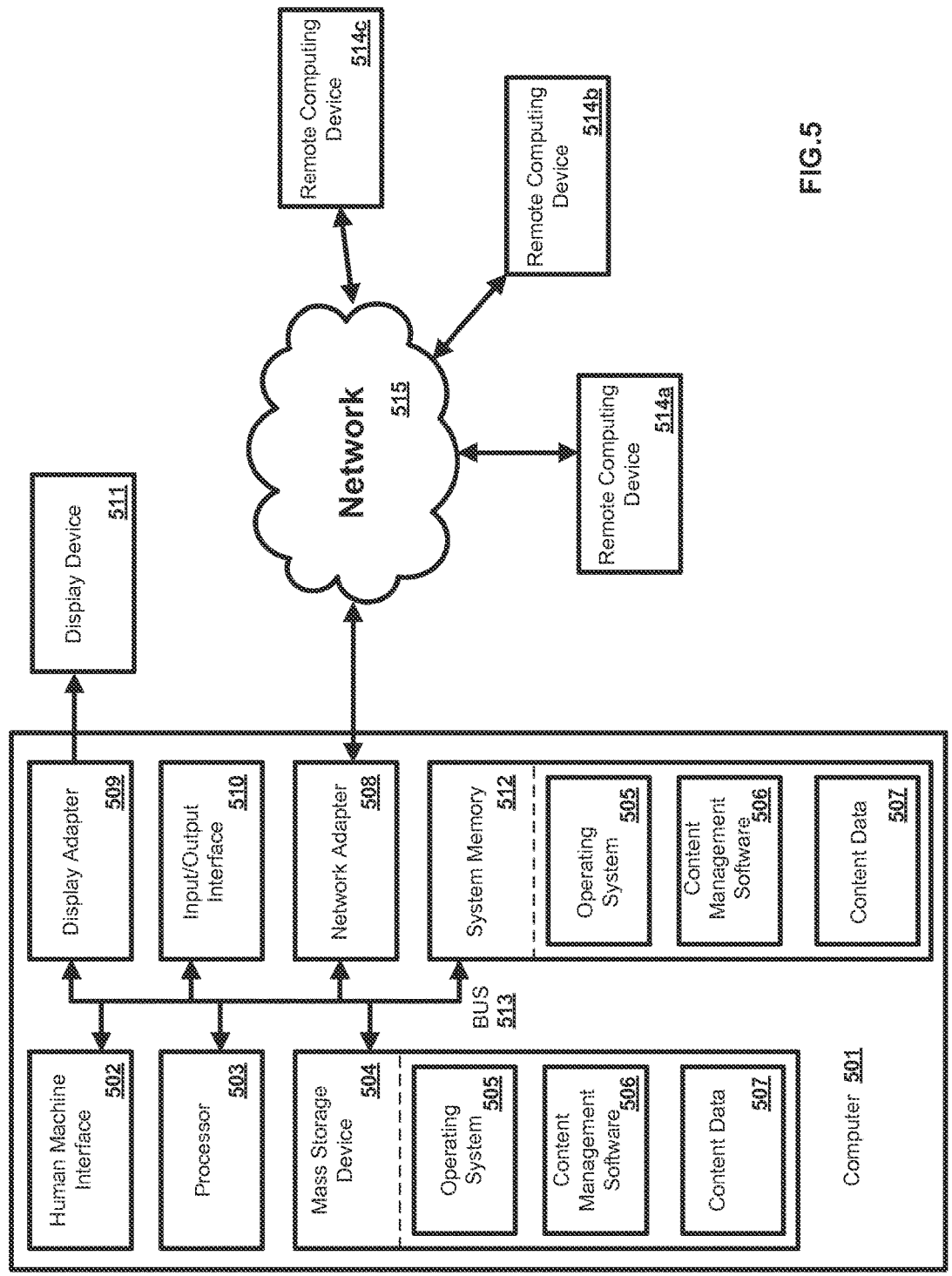
FIG. 5 is a block diagram illustrating an example computing device.

In an exemplary aspect, the methods and systems can be implemented on a computer 501 as illustrated in FIG. 5 and described below. By way of example, the user device 102, the plurality of services 101, and/or the information management device 103 of FIG. 1 can be computers as illustrated in FIG. 5. Similarly, the methods and systems disclosed can utilize one or more computers to perform one or more functions in one or more locations. FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors 503, a system memory 512, and a system bus 513 that couples various system components including the one or more processors 503 to the system memory 512. In some implementations, the system can utilize parallel computing.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The system bus 513, and all buses specified in this description can also be implemented over a wired or wireless network connection and each of the subsystems, including the one or more processors 503, a mass storage device 504, an operating system 505, content management software 506, content management data 507, a network adapter 508, system memory 512, an Input/Output Interface 510, a display adapter 509, a display device 511, and a human machine interface 502, can be contained within one or more remote computing devices 514*a,b,c* at physically separate locations, connected through buses of this form, in effect implementing a fully distributed system.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as content management data 507 and/or program modules such as operating system 505 and content management software 506 that are immediately accessible to and/or are presently operated on by the one or more processors 503.

In another aspect, the computer 501 can also comprise other removable/non-removable, volatile/non-volatile computer storage media. By way of example, FIG. 5 illustrates a mass storage device 504 which can provide non-volatile storage of computer code, computer readable instructions, data structures, program modules, and other data for the computer 501. For example and not meant to be limiting a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and content management software 506. Each of the operating system 505 and content management software 506 (or some combination thereof) can comprise elements of the programming and the content management software 506. Content management data 507 can also be stored on the mass storage device 504. Content management data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computer 501 can have more than one display adapter 509 and the computer 501 can have more than one display device 511. For example, a display device can be a monitor, an LCD (Liquid Crystal Display), or a projector. In addition to the display device 511, other output peripheral devices can comprise components such as speakers (not shown) and a printer (not shown) which can be connected to the computer 501 via Input/Output Interface 510. Any step and/or result of the methods can be output in any form to an output device. Such output can be any form of visual representation, including, but not limited to, textual, graphical, animation, audio, tactile, and the like. The display device 511 and computer 501 can be part of one device, or separate devices.

The computer 501 can operate in a networked environment using logical connections to one or more remote computing devices 514a,b,c. By way of example, a remote computing device can be a personal computer, portable computer, smartphone, a server, a router, a network computer, a peer device or other common network node, and so on. Logical connections between the computer 501 and a remote computing device 514a,b,c can be made via a network 515, such as a local area network (LAN) and/or a general wide area network (WAN). Such network connections can be through a network adapter 508. A network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components reside at various times in different storage components of the computer 501, and are executed by the data processor(s) of the computer. An implementation of content management software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory, or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:
1. A method, comprising:
   collecting, by a first computing device, events related to a content item, wherein the events comprise a first event of a user pausing the content item for a time period;

categorizing, by the first computing device based on a user interest in delaying receipt of information related to the content item, the events;

assigning, by the first computing device based on the categorization, weight values to each of the events, wherein each of the weight values is based on whether each of the events is indicative of the user interest in delaying receipt of the information related to the content item, wherein the first event is assigned a first weight value indicative of the user interest in receiving the information related to the content item with delay;

determining, by the first computing device based on the categorization of the events and the weight values assigned to the events, to hide the information related to the content item from the user; and transmitting, by the first computing device to a second computing device based on the determination to hide the information related to the content item from the user, an instruction to modify the content item to hide the information related to the content item from the user, wherein the instruction causes the second computing device to modify the content item.

2. The method of claim 1, wherein the content item comprises a competitive event, and wherein the information related to the content item comprises scoring information associated with the competitive event.

3. The method of claim 1, wherein the instruction comprises an instruction to block reception of the information related to the content item thereby preventing the information related to the content item from being updated.

4. The method of claim 3, wherein the events comprise a second event of scheduling a recording and a third event of rewinding the recording, and wherein the instruction to block reception of the information related to the content item is in response to occurrence of both the second event and the third event.

5. The method of claim 1, wherein the events comprise delaying, from a time of a live event, providing the content item to the user.

6. The method of claim 1, further comprising determining one or more computing devices associated with the user, and selecting the second computing device from the one or more computing devices based on an application being on the second computing device, wherein the application is configured to provide the information related to the content item to the user.

7. The method of claim 1, wherein collecting, by a first computing device, events related to the content item comprises monitoring a plurality of content related services.

8. A method, comprising:

receiving, by a first computing device, a plurality of information blocking preferences;

applying, by the first computing device based on the plurality of information blocking preferences, an information blocking scheme to a plurality of content items;

determining, by the first computing device, display of a first content item of the plurality of content items;

monitoring, by the first computing device while the first content item is displayed, for one or more triggering actions;

detecting, by the first computing device, a first triggering action of the one or more triggering actions, wherein the first triggering action comprises a user pausing the first content item for a time period;

assigning, by the first computing device, respective weight values to the one or more triggering actions, wherein each of the weight values is based on whether the corresponding triggering action is indicative of a user interest in delaying receipt of the information related to the first content item, wherein the first triggering action is assigned a first weight value indicative of the user interest in not delaying receipt of the information related to the first content item;

updating, by the first computing device based on assigning the first weight value to the first triggering action, the information blocking scheme; and transmitting, by the first computing device to a second computing device based on the updated information blocking scheme, an instruction to modify the content item to reveal the information related to the first content item to the user, wherein the second computing device modifies the content item based on the instruction.

9. The method of claim 8, wherein monitoring, by the first computing device while the first content item is displayed, for the one or more triggering actions comprises detecting a change to a second content item, and wherein updating, by the first computing device based on assigning the first weight value to the first triggering action, the information blocking scheme comprises turning off the information blocking for the first content item and turning on the information blocking for the second content item.

10. The method of claim 8, wherein determining, by the first computing device, display of the first content item comprises determining that the user started playing the first content item.

11. The method of claim 7, wherein the plurality of content related services are configured to provide information related to the content item from an electronic program guide.

12. An apparatus comprising:

one or more processors; and a memory storing processor executable instructions that, when executed by the one or more processors, cause the apparatus to:

collect events related to a content item, wherein the events comprise a first event of a user pausing the content item for a time period;

categorize, based on a user interest in delaying receipt of information related to the content item or a user interest in not delaying receipt of information related to the content item, the events;

assign, based on the categorization, weight values to each of the events, wherein each of the weight values is based on whether each of the events is indicative of the user interest in delaying receipt of the information related to the content item, wherein the first event is assigned a first weight value indicative of the user interest in receiving the information related to the content item with delay;

determine, based on the categorization of the events and the weight values assigned to the events, to hide the information related to the content item from the user; and transmit, to a computing device based on the determination to hide the information related to the content item from the user, an instruction to modify the content item to hide the information related to the content item from the user, wherein the second computing device modifies the content item based on the instruction.

13. The apparatus of claim 12, wherein the content item comprises a competitive event, and wherein the information related to the content item comprises scoring information associated with the competitive event.

14. The apparatus of claim 12, wherein the instruction comprises an instruction to block reception of the information related to the content item thereby preventing the information related to the content item from being updated.

15. The apparatus of claim 14, wherein the events comprise a second event of scheduling a recording and a third event of rewinding the recording, and wherein the instruction to block reception of the information related to the content item is in response to occurrence of both the second event and the third event.

16. The apparatus of claim 12, wherein the events comprise delaying, from a time of a live event, providing the content item to the user.

17. The apparatus of claim 12, wherein the processor executable instructions, when executed by the one or more processors, further cause the apparatus to:
   determine one or more computing devices associated with the user, and
   select, based on an application being on the computing device, the computing device from the one or more devices, wherein the application is configured to provide the information related to the content item to the user.

18. The apparatus of claim 12, wherein the processor executable instructions, when executed by the one or more processors, further cause the apparatus to collect events related to the content item by monitoring a plurality of content related services.

19. The apparatus of claim 18, wherein the plurality of content related services are configured to provide information related to the content item from an electronic program guide.

20. The method of claim 8, further comprising, providing by a dedicated application on the second computing device, information related to a plurality of competitive events.

* * * * *